UNITED STATES PATENT OFFICE.

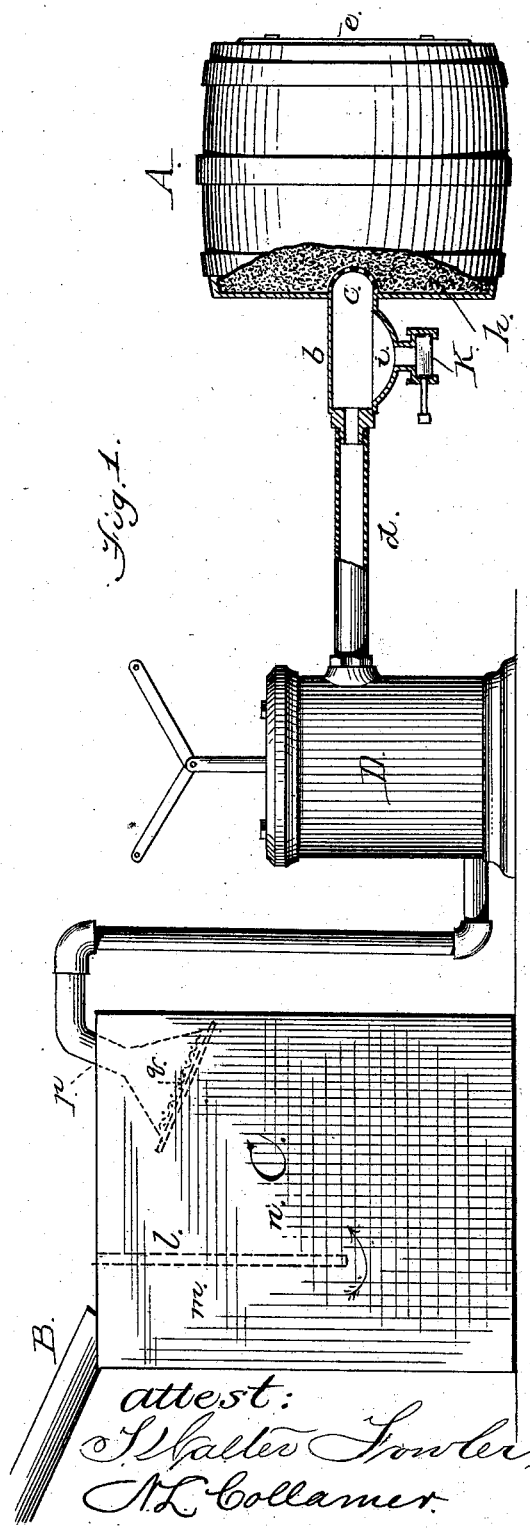

JONATHAN MILLER, OF CONCORD, NEW HAMPSHIRE.

APPARATUS FOR COLLECTING AND SAVING METALLIC PARTICLES.

SPECIFICATION forming part of Letters Patent No. 290,258, dated December 18, 1883.

Application filed May 16, 1883. (No model.)

*To all whom it may concern:*

Be it known that I, JONATHAN MILLER, a citizen of the United States, residing at Concord, in the county of Merrimac and State of New Hampshire, have invented certain improvements in apparatus for collecting and saving metallic particles and other substances contained in or floating upon the surface of water, of which the following is a full, clear, and exact description, reference being had to the accompanying drawings, making a part of this specification, in which—

Figure 1 is a general view of the apparatus, and Fig. 2 is an end view of the straining device.

My invention relates to an improved apparatus whereby metallic particles—such as flour-gold, chlorides and carbonates of silver, &c., and other substances contained in or floating upon the surface of water—can be collected and saved in a much more rapid, perfect, and economical manner than heretofore; and to this end it consists in certain details of construction and combinations of devices, as hereinafter fully described and claimed.

In the said drawings, A is a closed chamber or receptacle, composed of wood, metal, or other suitable material of sufficient strength to withstand a heavy pressure. This receptacle is provided on one side with an inlet-pipe, $b$, at the inner end of which, just within the receptacle A, is a strainer, $c$, while its outer end is provided with a screw-thread by means of which the conducting-pipe $d$ for the water is secured thereto. Within the end of the receptacle A, opposite to the inlet-pipe $b$, is formed a large opening or outlet, $e$, which is covered by a perforated plate, $f$, made removable from the opening $e$, and securely held in place by bars $g$, Fig. 2, provided with suitable fastenings, or in any other convenient manner. The receptacle A is filled with sawdust $h$, or other equivalent porous ground or loose material capable of expansion by moisture.

On the under side of the inlet-pipe $b$ is a concave chamber, $i$, provided at the center with a discharge-aperture commanded by a valve or gate, $k$, by which construction any particles of matter which are prevented by the strainer $c$ from entering the receptacle A are deposited or fall back into the chamber $i$, from which they may be withdrawn from time to time by opening the gate $k$, and the clogging or obstruction of the inlet-pipe thus prevented. The water containing the metallic particles, chlorides, carbonates, &c., or other substance or substances is first conducted by a sluice or trough, B, to a tank or reservoir, C, provided with a partition, $l$, extending downward from its top toward the bottom, the water first entering the portion or chamber $m$ and thence flowing under the partition $l$ up into the portion or chamber $n$, the heavier particles of matter contained in the water settling to the bottom of the reservoir, leaving only the lighter particles in the portion $n$. From this portion $n$ of the reservoir the water is drawn by a force-pump, D, of any suitable construction, the suction-pipe $p$ of which is provided with a strainer, $q$. The water is then forced by the pump D through the pipes $d$ and $b$ into and through the sawdust or equivalent porous material $h$ contained in the receptacle A, and discharged through the perforated plate $f$. As the water enters the receptacle A it is diffused and evenly and uniformly distributed throughout the entire mass of sawdust $h$, which at once commences to swell, the expansion thus produced causing the mass to exert a heavy outward pressure against all portions of the interior of the receptacle A, within which the sawdust is thus closely and tightly packed, so as to be held firmly and immovably in place against any tendency of the water to distribute it, or to produce a direct channel from the inlet to the outlet, the effect produced being exactly the reverse of what would result from compression, as the expansion of the particles tends to enlarge them and open their pores, leaving minute passages or interstices in all directions throughout the mass for the flow of the water, which is thus finely divided up into very minute globules, causing every particle of metal or other substances contained therein to be brought into contact with the rough fibers projecting from the particles of sawdust or other porous material which project into the interstices, and while they do not interfere with the flow of the water, yet serve to catch and retain the particles of metal or other substance therein; and consequently when the water finally escapes through the perforated plate $f$, it will have been deprived of all metallic particles, chlorides, carbonates, or other substances which it may contain, which are thereby saved or collected, as required.

After the apparatus has been in use for the desired length of time, which will vary according to circumstances, the plate $f$ is removed from the end of the receptacle A, and the sawdust or other porous material employed withdrawn, after which, when the apparatus has been used for collecting metal, it is burned or otherwise treated to secure the metal contained therein.

Where the water containing the metallic particles or other subtances flows from a sufficient elevation to produce the desired head, it is evident that the force-pump D may be dispensed with.

Having thus described my invention, what I claim as new, and desire to secure by Letters Patent, is—

An apparatus for recovering metals or metallic compounds in liquids, consisting of the rigid tank A, perforated on one side, in combination with the entrance-pipe C, provided with trap $i$, and a pressure device, D, substantially as set forth.

JONATHAN MILLER.

Witnesses:
N. L. COLLAMER,
C. P. WEBSTER.